United States Patent
Hu et al.

(10) Patent No.: US 9,084,258 B2
(45) Date of Patent: Jul. 14, 2015

(54) DYNAMIC SUB-FRAME CONFIGURATION METHOD AND APPARATUS IN TIME DIVISION DUPLEX SYSTEM

(75) Inventors: Liujun Hu, Shenzhen (CN); Feng Bi, Shenzhen (CN); Changqing Zhu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 225 days.

(21) Appl. No.: 13/820,257

(22) PCT Filed: Jun. 28, 2011

(86) PCT No.: PCT/CN2011/076531
§ 371 (c)(1),
(2), (4) Date: Mar. 1, 2013

(87) PCT Pub. No.: WO2012/028025
PCT Pub. Date: Mar. 8, 2012

(65) Prior Publication Data
US 2013/0155917 A1 Jun. 20, 2013

(30) Foreign Application Priority Data
Sep. 2, 2010 (CN) .......................... 2010 1 0270199

(51) Int. Cl.
*H04W 72/04* (2009.01)
*H04W 16/10* (2009.01)
(Continued)

(52) U.S. Cl.
CPC ......... *H04W 72/0446* (2013.01); *H04L 5/0003* (2013.01); *H04L 5/0044* (2013.01); *H04L 5/0053* (2013.01); *H04L 27/2601* (2013.01); *H04W 16/10* (2013.01)

(58) Field of Classification Search
CPC ................................................ H04W 72/0446
USPC ........ 370/280, 294, 332, 350; 455/446, 552.1
See application file for complete search history.

(56) References Cited

U.S. PATENT DOCUMENTS

| | | | |
|---|---|---|---|
| 2003/0117980 A1* | 6/2003 | Kim et al. ..................... | 370/332 |
| 2007/0238482 A1* | 10/2007 | Rayzman et al. .......... | 455/552.1 |

(Continued)

FOREIGN PATENT DOCUMENTS

| | | |
|---|---|---|
| CN | 101400081 A | 4/2009 |
| CN | 101483476 A | 7/2009 |

(Continued)

OTHER PUBLICATIONS

International Search Report in international application No. PCT/CN2011/076531, mailed on Oct. 13, 2011.
(Continued)

*Primary Examiner* — Brian D Nguyen
*Assistant Examiner* — Toan Nguyen
(74) *Attorney, Agent, or Firm* — Oppedahl Patent Law Firm LLC

(57) ABSTRACT

The present application discloses a dynamic sub-frame configuration method in the TDD system. The method includes: in the case that the uplink and downlink sub-frame configuration of a cell and the uplink and downlink sub-frame configuration of its neighboring cell are different in the configuration of a sub-frame, a part of resources on the sub-frame are made to be silent for the cell, and the resources on the sub-frame corresponding to the resources not silenced on the sub-frame for cell are made to be silent for the neighboring cell; or, a part of resources on the sub-frame are made to be silent for the neighboring cell, and the resources on the sub-frame corresponding to the resources not silenced on the sub-frame for the neighboring cell are made to be silent for the cell. The present application further provides a dynamic sub-frame configuration apparatus in the TDD system. Not only can the problem that inter-cell interference is introduced during sub-frame switching in the TDD system be solved, but also the normal uplink and downlink measurement can be guaranteed, without affecting ACK/NACK feedback and HARQ process, and meantime the frequency spectrum utilization ratio is increased.

17 Claims, 6 Drawing Sheets

(51) Int. Cl.
*H04L 5/00* (2006.01)
*H04L 27/26* (2006.01)

(56) References Cited

U.S. PATENT DOCUMENTS

| | | | |
|---|---|---|---|
| 2008/0240072 A1* | 10/2008 | Bykovnikov | 370/350 |
| 2009/0046649 A1 | 2/2009 | Gao | |
| 2009/0186621 A1* | 7/2009 | Umeda et al. | 455/446 |
| 2010/0260169 A1* | 10/2010 | Gheorghiu et al. | 370/350 |
| 2010/0271998 A1 | 10/2010 | Jin | |

FOREIGN PATENT DOCUMENTS

| | | |
|---|---|---|
| WO | 2009022295 A2 | 2/2009 |
| WO | 2010049587 A1 | 5/2010 |

OTHER PUBLICATIONS

English Translation of the Written Opinion of the International Search Authority in international application No. PCT/CN2011/076531, mailed on Oct. 13, 2011.

* cited by examiner

Prior Art

DYNAMIC SUB-FRAME CONFIGURATION METHOD AND APPARATUS IN TIME DIVISION DUPLEX SYSTEM

TECHNICAL FIELD

The disclosure relates to a Time Division Duplex (TDD) system of Long Term Evolution (LTE) and Long Term Evolution Advanced (LTE-A) in the 3rd Generation Partnership Project (3GPP), and in particular to a dynamic sub-frame configuration method and apparatus in the TDD system.

BACKGROUND

The duplex technology is an important component of the mobile communication system as well as the landmark technology of the mobile communication system. The duplex technology can meet transmission requirements, realize isolation of uplink and downlink resources, ensure the normal transmission, and effectively reduce the mutual interference. The duplex technology used in the mobile communication system mainly includes Frequency Division Duplex (FDD) and TDD. The FDD needs two independent frequency bands, one is used for transmitting downlink information from a base station to a mobile station, and the other is used for transmitting uplink information from the mobile station to a base station. There is a protection frequency band between the two frequency bands, for preventing mutual interference between the adjacent transmitter and receiver. The TDD needs only a frequency band through which both downlink information and uplink information are transmitted, the transmitter and the receiver performs transmission and reception on different sub-frames, without causing mutual interference.

At present, the LTE system, the LTE-A system and the International Mobile Telecommunication Advanced (IMT-A) system all adopt the FDD mode or the TDD mode. Because the FDD must adopt paired frequency band and differentiates uplink and downlink based on the frequency band, the frequency spectrum utilization ratio is reduced greatly when the FDD supports the asymmetric service. The TDD mode uses the same frequency band to transmit the uplink information and the downlink information in time division way. Specifically, the sub-frame of radio frame is divided into uplink sub-frame and downlink sub-frame in a certain proportion according to the service types in different regions, that is to say, a proper uplink and downlink proportion configuration is selected to perform time-division transmission, which is beneficial to increasing the spectrum effectiveness of the TDD system. For example, for the region with more downlink data services, the uplink and downlink proportion configuration with more downlink sub-frames may be selected; for the region with more uplink data services, the uplink and downlink proportion configuration with more uplink sub-frames may be selected; for the region with balanced volume of uplink data service and downlink data service, the uplink and downlink proportion configuration with equal uplink and downlink sub-frames may be selected.

In the current LTE TDD system, as shown in FIG. 1,  represents a Radio Frame (RF),  represents a Sub-Frame (SF), an RF of 10 ms includes 10 sub-frames of 1 ms, and the sub-frame numbers are respectively: 0, 1, 2, 3, 4, 5, 6, 7, 8 and 9, or #0 represents sub-frame 0, #1 represents sub-frame 1, and so on. There are 7 TDD uplink and downlink proportion configurations, as shown in Table 1, D represents that the sub-frame is a downlink sub-frame, U represents that the sub-frame is an uplink sub-frame, S represents that the sub-frame is a special sub-frame, namely the sub-frame includes a part of uplink transmission as well as a part of downlink transmission.

TABLE 1

| uplink and downlink proportion configuration | Sub-frame number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

The LTE-A system takes the Orthogonal Frequency Division Multiplexing (OFDM) technology as basis, wherein the data structure of sub-frame is mainly in the form of time-frequency two-dimension. As shown in FIG. 1 and FIG. 2,  represents an OFDM signal, each sub-frame has two timeslots, the OFDM signals in a single continuous timeslot on the time domain form a Resource Block (RB), an RB includes $N_{symb} \times N_{SC}^{RB}$ Resource Elements (RE), wherein $N_{symb}$ represents the quantity of OFDM signals in a timeslot, and $N_{SC}^{RB}$ represents the quantity of continuous subcarriers of the resource block on the frequency domain. In the LTE system, there are 12 or 24 continuous subcarriers on the frequency domain; when a normal Cyclic Prefix (CP) is adopted, each sub-frame includes 14 OFDM signals; when an extended Cyclic Prefix (CP) is adopted, each sub-frame includes 12 OFDM signals, wherein the serial number of the OFDM signal starts from 0, for example, #0 represents the first OFDM signal.

At present, in order to not introduce inter-cell interference, the TDD uplink and downlink sub-frame configurations of neighboring cells in the LTE-A system are often identical. However, when the service type of the current cell is different from that of the neighboring cell, the current cell needs to change its own uplink and downlink sub-frame configuration, so as to increase the spectrum effectiveness of the TDD system, while its neighboring cell does not need to change its uplink and downlink sub-frame configuration, as a consequence, when the uplink and downlink sub-frame configuration of the current cell is different from that of its neighboring cell, the inter-cell interference occurs.

For example, in the case that the current cell and its neighboring cells adopt the uplink and downlink sub-frame configuration 0 shown in Table 1, when the downlink data service of the current cell is increased, and the downlink data service of its neighboring cells remains unchanged, the current cell needs to change its own uplink and downlink sub-frame configuration to the configuration with more downlink sub-frames, such as the uplink and downlink sub-frame configuration 1 in Table 1. For example, in the case that the current cell and its neighboring cells adopt the uplink and downlink sub-frame configuration 1 shown in Table 1, when the uplink data service of the current cell is increased, and the uplink data service of its neighboring cells remains unchanged, the current cell needs to change its own uplink and downlink sub-frame configuration to the configuration with more uplink sub-frames, such as the uplink and downlink sub-frame configuration 0 in Table 1. In this way, when the current cell changes its own uplink and downlink sub-frame configuration, according to Table 1, the inter-cell interference will occur on sub-frames 4 and 9 in above example.

The inter-cell interference caused by the difference between the uplink and downlink sub-frame configuration of the current cell and that of its neighboring cells is mainly solved by the following method: setting the sub-frames which will cause the inter-cell interference as blank sub-frames so as to not transmit any information through these sub-frames, but this will affect uplink and downlink measurement as well as the process such as uplink Acknowledgement/Negative Acknowledgement (ACK/NACK) feedback and downlink Hybrid Automatic Repeat Request (HARQ), along with the waste of resources.

Specifically, regarding the above two examples, the sub-frame 4 and the sub-frame 9 are configured not to transmit any information. For the first example, when the current cell sets its own uplink sub-frame 4 and uplink sub-frame 9 as blank sub-frames to reduce the interference between itself and the neighboring cell, the uplink sub-frame 4 and the uplink sub-frame 9 cannot transmit the Sounding Reference Signal (SRS), the Physical Uplink Control Channel (PUCCH) and the Physical Uplink Shared Channel (PUSCH), which causes the base station side to be incapable of performing measurement, affects the uplink ACK/NACK feedback and the downlink HARQ process, and causes a serious waste of uplink resources. In the above second example, when the current cell sets its own downlink sub-frame 4 and downlink sub-frame 9 as blank sub-frames to reduce the interference between itself and the neighboring cell, the downlink sub-frame 4 and the downlink sub-frame 9 cannot transmit the Cell-specific Reference Signals (CRS), the Physical Downlink Control Channel (PDCCH), the Physical Hybrid-ARQ Indicator Channel (PHICH) and the Physical Downlink Shared Channel (PDSCH), which causes the terminal side to be incapable of performing measurement, affects the downlink ACK/NACK feedback and the uplink HARQ process, and causes a serious waste of downlink resources.

SUMMARY

In view of the above, the disclosure mainly aims to provide a dynamic sub-frame configuration method and apparatus in the TDD system, to reduce the inter-cell interference introduced during sub-frame switching in the TDD system, meanwhile uplink and downlink measurement can be implemented and resources will not be wasted.

For achieving the above aim, the following technical solutions are provided.

In one aspect, a dynamic sub-frame configuration method in a TDD system is provided, which includes: in the case that the uplink and downlink sub-frame configuration of a cell and the uplink and downlink sub-frame configuration of its neighboring cell are different in the configuration of a sub-frame, the resources in a set timeslot and/or a set bandwidth on the sub-frame are silenced for the cell, and the resources on the sub-frame corresponding to the resources not silenced on the sub-frame for the cell are silenced for the neighboring cell; or, the resources in the set timeslot and/or the set bandwidth on the sub-frame are silenced for the neighboring cell, and the resources on the sub-frame corresponding to the resources not silenced on the sub-frame for the neighboring cell are silenced for the cell.

In the above solution, the method may further include: when the cell and/or the neighboring cell need/needs to transmit information on the sub-frame, the information is transmitted only through their respective resources not silenced on the sub-frame.

In the above solution, the quantity of the set bandwidth is one or more.

In the above solution, the operation of silencing the resources in the set timeslot may include: the resources in a first timeslot of the sub-frame are silenced for the cell, and the resources in a second timeslot of the sub-frame are silenced for the neighboring cell; or, the resources in the second timeslot of the sub-frame are silenced for the cell, and the resources in the first timeslot of the sub-frame are silenced for the neighboring cell.

In the above solution, the operation of silencing the resources in the set timeslot and the set bandwidth may include: the resources in the first or the second timeslot of the sub-frame within the set bandwidth are silenced for the cell, and the resources on the sub-frame corresponding to the resources not silenced for the cell are silenced for the neighboring cell; or, the resources in the first or the second timeslot of the sub-frame within the set bandwidth are silenced for the neighboring cell, and the resources on the sub-frame corresponding to the resources not silenced on the sub-frame for the neighboring cell are silenced for the cell.

In the above solution, the operation of silencing the resources in the set timeslot and the set bandwidth may include: the resources except control domain in the first timeslot of the sub-frame within the set bandwidth and the resources in the second timeslot of the sub-frame within the set bandwidth are silenced for the cell, and the resources on the sub-frame corresponding to the resources not silenced on the sub-frame for the cell are silenced for the neighboring cell; or, s the resources except the control domain in the first timeslot of the sub-frame within the set bandwidth and the resources in the second timeslot of the sub-frame within the set bandwidth are silenced for the neighboring cell, and the resources on the sub-frame corresponding to the resources not silenced on the sub-frame for the neighboring cell are silenced for the cell.

In the above solution, the operation of silencing the resources in the set timeslot and the set bandwidth may include: a first set bandwidth and a second set bandwidth are preset; the resources except the control domain in the first timeslot of the sub-frame within the first set bandwidth and the resources in the second timeslot of the sub-frame within the second set bandwidth are silenced for the cell, and the resources on the sub-frame corresponding to the resources not silenced on the sub-frame for the cell are silenced for the neighboring cell; or, the resources except the control domain in the first timeslot of the sub-frame within the first set bandwidth and the resources in the second timeslot of the sub-frame within the second set bandwidth are silenced for the neighboring cell, and the resources on the sub-frame corresponding to the resources not silenced on the sub-frame for the neighboring cell are silenced for the cell.

In another aspect, a dynamic sub-frame configuration apparatus in a TDD system is provided, which includes: a first silencing unit and a second silencing unit, wherein in the case that the uplink and downlink sub-frame configuration of a cell and the uplink and downlink sub-frame configuration of its neighboring cell are different in the configuration of a sub-frame, the first silencing unit is configured to silence the resources in a set timeslot and/or a set bandwidth on the sub-frame for the cell, and the second silencing unit is configured to silence the resources on the sub-frame for the neighboring cell corresponding to the resources on the sub-frame not silenced by the first silencing unit for the cell; or, the first silencing unit is configured to silence the resources in the set timeslot and/or the set bandwidth on the sub-frame for the neighboring cell, and the second silencing unit is configured to silence the resources on the sub-frame for the cell corresponding to the resources on the sub-frame not silenced by the first silencing unit for the neighboring cell.

In the above solution, the apparatus may further include: a transmitting unit, wherein the transmitting unit is configured to, when the cell and/or the neighboring cell need/needs to transmit information on the sub-frame, transmit the information only through their respective resources not silenced on the sub-frame.

In the disclosure, by silencing a part of resources on the sub-frame for a certain cell, and by silencing the resources on the sub-frame for its neighboring cell corresponding to the resources not silenced on the sub-frame for the certain cell, not only can the problem that inter-cell interference is introduced during sub-frame switching in the TDD system be solved, but also the normal uplink and downlink measurement can be guaranteed because the resources not silenced on the sub-frames either for the certain cell or for the neighboring cell can still transmit uplink information or downlink information, without affecting ACK/NACK feedback and HARQ process, and meantime the frequency spectrum utilization ratio is increased.

DETAILED DESCRIPTION

Figure 1:
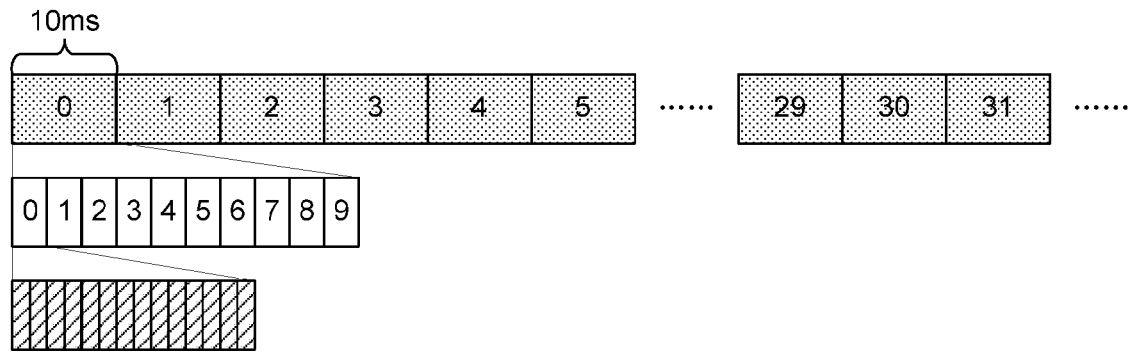
FIG. 1 shows a structure diagram of a sub-frame in the LTE-A system.
Figure 2:
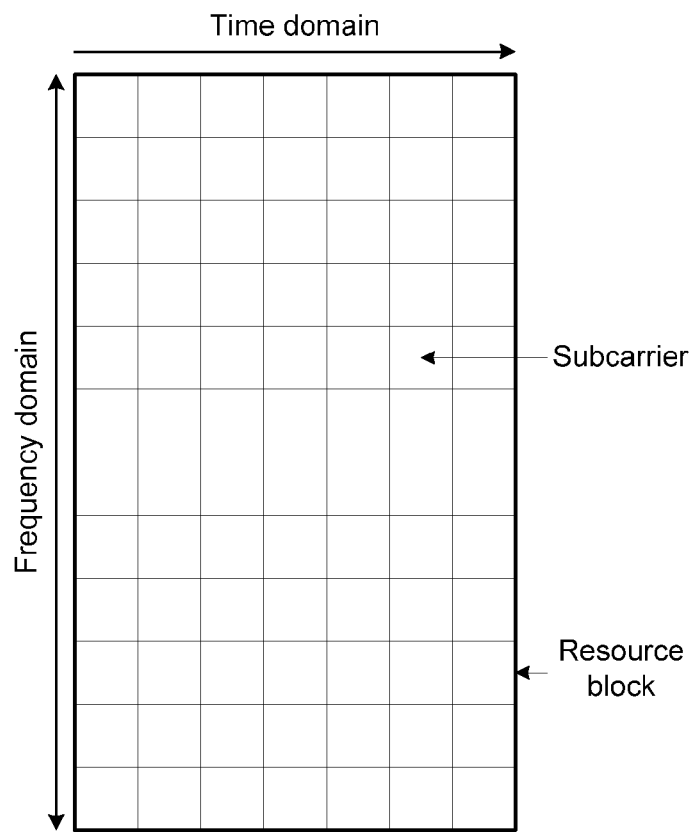
FIG. 2 shows a structure diagram of a resource block and a subcarrier in the LTE-A system.

The dynamic sub-frame configuration method in the TDD system according to the disclosure is applied to the scenario that the uplink and downlink sub-frame configuration of the current cell is different from that of its neighboring cell, and can eliminate inter-cell interference which may exist in the scenario. The method according to the disclosure mainly includes: in the TDD system, in the case that the uplink and downlink sub-frame configuration of a certain cell and that of its neighboring cell are different in the configuration of a sub-frame, the resources in a set timeslot and/or a set bandwidth on the sub-frame are made to be silent for the certain cell, and the resources on the sub-frame corresponding to the resources not silenced on the sub-frame for the certain cell are made to be silent for the neighboring cell; alternatively, the resources in the set timeslot and/or the set bandwidth on the sub-frame are made to be silent for the neighboring cell, and the resources on the sub-frame corresponding to the resources not silenced on the sub-frame for the neighboring cell are made to be silent for the certain cell.

Here, there is no particular order for the above process, and it is also feasible to first silence the resources out of the set timeslot and/or the set bandwidth on the sub-frame for the certain cell, and then silence the resources in the set timeslot and/or the set bandwidth on the sub-frame for the neighboring cell. The above process is implemented either through consultation between the certain cell and the neighboring cell, or through other ways such as dynamic configuration or static configuration.

Here, the resources may be categorized into timeslot resources and frequency resources, wherein the timeslot resources mean one or more OFDM signals in a specific timeslot, and the frequency resources mean one or more subcarriers or resource blocks in a specific bandwidth.

Here, the method may further include: when the cell and/or the neighboring cell need/needs to transmit information on the sub-frame where the configuration for the certain cell is different from the configuration for the neighboring cell, the information is transmitted only through the resources of the certain cell or the neighboring cell not silenced on the sub-frame.

Here, the information to be transmitted may be downlink information or uplink information. If the sub-frame is configured as an uplink sub-frame, the information to be transmitted is the uplink information; if the sub-frame is configured as a downlink sub-frame, the information to be transmitted is the downlink information. Specifically, the downlink information may include one or more pieces of the following information: downlink control information, downlink feedback information, downlink service information and downlink reference signal; the uplink information may include one or more pieces of the following information: uplink control information, uplink feedback information, uplink service information and uplink reference signal.

In the disclosure, there may be one or more set bandwidths. A set bandwidth means continuous bandwidth within the given range, and the set bandwidth here is within the bandwidth range that a sub-frame includes. In practical application, frequency of the resources to be silenced may be preset according to actual need.

For example, predetermination of the set bandwidth may be implemented by inter-cell consultation. After consultation, if the local cell finds by detecting that the channel quality of the resources in the set bandwidth is more suitable for itself, the local cell silences the frequency resources out of the set bandwidth and notifies its neighboring cell, and the local cell transmits information through the resources in the set bandwidth on the sub-frame when it needs to transmit information through the sub-frame. After receiving the notice, the neighboring cell silences its own frequency resources in the set bandwidth on the sub-frame, and transmits information through the resources out of the set bandwidth on the sub-frame when it needs to transmit information through the sub-frame.

In the disclosure, the set timeslot may be either the first timeslot or the second timeslot of the sub-frame. In practical application, a timeslot may be preset to be silent according to actual need.

In the method, the operation of silencing the resources in a set timeslot may include: the resources in the first timeslot of the sub-frame are made to be silent for the local cell, and the resources in the second timeslot of the sub-frame are made to be silent for the neighboring cell; alternatively, the resources in the second timeslot of the sub-frame are made to be silent for the local cell, and the resources in the first timeslot of the sub-frame are made to be silent for the neighboring cell.

Specifically, the operation of silencing the resources in the first timeslot of the sub-frame for the local cell, and silencing the resources in the second timeslot of the sub-frame for the neighboring cell may further include: when the local cell needs to transmit information on the sub-frame, the local cell transmits the information only through its own resources in the second timeslot of the sub-frame; when the neighboring cell needs to transmit information on the sub-frame, the neighboring cell transmits the information only through its own resources in the first timeslot of the sub-frame.

Similarly, the operation of silencing the resources in the second timeslot of the sub-frame for the local cell, and silencing the resources in the first timeslot of the sub-frame for the neighboring cell may further include: when the local cell needs to transmit information on the sub-frame, the local cell transmits the information only through its own resources in the first timeslot of the sub-frame; when the neighboring cell needs to transmit information on the sub-frame, the neighboring cell transmits the information only through its own resources in the second timeslot of the sub-frame.

The operation of silencing the resources in the set timeslot and the set bandwidth according to the method may include: silencing the resources in the first or the second timeslot of the sub-frame within the set bandwidth for the local cell, and silencing the resources on the sub-frame for the neighboring cell corresponding to the resources not silenced on the sub-frame for the local cell; or, silencing the resources in the first or the second timeslot of the sub-frame within the set bandwidth for the neighboring cell, and silencing the resources on the sub-frame for the local cell corresponding to the resources not silenced on the sub-frame for the neighboring cell.

Alternatively, the operation of silencing the resources in the set timeslot and the set bandwidth according to the method may further include: presetting the first set bandwidth and the second set bandwidth; silencing the resources except the control domain in the first timeslot of the sub-frame within the first set bandwidth and the resources in the second timeslot of the sub-frame within the second set bandwidth for the local cell, and silencing the resources on the sub-frame for the neighboring cell corresponding to the resources not silenced on the sub-frame for the local cell; alternatively, silencing the resources except the control domain in the first timeslot of the sub-frame within the first set bandwidth and the resources in the second timeslot of the sub-frame within the second set bandwidth for the neighboring cell, and silencing the resources on the sub-frame for the local cell corresponding to the resources not silenced on the sub-frame for the neighboring cell.

Alternatively, the operation of silencing resources in the set timeslot and the set bandwidth according to the method may further include: silencing the resources except the control domain in the first timeslot of the sub-frame within the set bandwidth and the resources in the second timeslot of the sub-frame within the set bandwidth for the local cell, and silencing the resources on the sub-frame for the neighboring cell corresponding to the resources not silenced on the sub-frame for the local cell; alternatively, silencing the resources except the control domain in the first timeslot of the sub-frame within the set bandwidth and the resources in the second timeslot of the sub-frame within the set bandwidth for the neighboring cell, and silencing the resources on the sub-frame for the local cell corresponding to the resources not silenced on the sub-frame for the neighboring cell.

Figure 3:
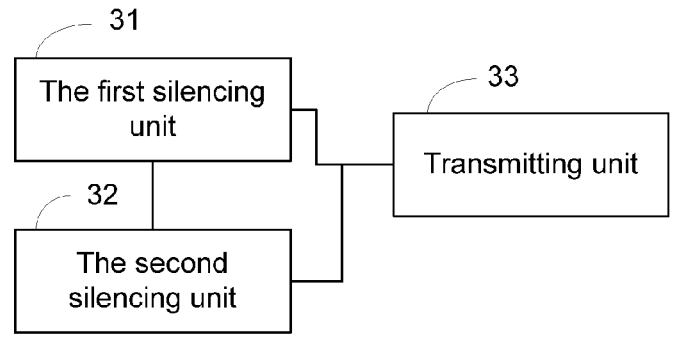
FIG. 3 shows a structure diagram of a dynamic sub-frame configuration apparatus in the TDD system according to the disclosure.

For implementing the method, the disclosure further provides a dynamic sub-frame configuration apparatus in the TDD system. With reference to FIG. 3, the apparatus mainly includes: a first silencing unit 31 and a second silencing unit 32, wherein in the case that the uplink and downlink sub-frame configuration of a certain cell and that of a neighboring cell are different in the configuration of a sub-frame, the first silencing unit 31 is configured to silence the resources in a set timeslot and/or a set bandwidth on the sub-frame for a certain cell, and the second silencing unit 32 is configured to silence the resources on the sub-frame for the neighboring cell corresponding to the resources not silenced on the sub-frame by the first silencing unit 31 for the certain cell; alternatively, the first silencing unit 31 is configured to silence the resources in the set timeslot and/or the set bandwidth on the sub-frame for the neighboring cell, and the second silencing unit 32 is configured to silence the resources on the sub-frame for the cell corresponding to the resources not silenced on the sub-frame by the first silencing unit 31 for the neighboring cell.

In the disclosure, the apparatus may further include: a transmitting unit 33, which is configured to, when the certain cell and/or the neighboring cell need/needs to transmit information on the sub-frame where the configuration for the certain cell is different from the configuration for the neighboring cell, the information is transmitted only through the resources of the certain cell and/or the neighboring cell which are not silenced on the sub-frame.

In application, the apparatus of the disclosure may be set in the certain cell and the neighboring cell, or set in the TDD system to which the certain cell and the neighboring cell belong, so as to implement dynamic sub-frame configuration in the TDD system according to the above method.

Embodiment 1

In this embodiment, the TDD system includes 3 cells, which are respectively cell 1 (Cell_1), cell 2 (Cell_2) and cell 3 (Cell_3). Cell_1, Cell_2 and Cell_3 all adopt the uplink and downlink sub-frame configuration 0 in Table 1 initially; after that, the uplink and downlink sub-frame configuration of Cell_2 is switched to the uplink and downlink sub-frame configuration 1 because its downlink services increase, the uplink and downlink sub-frame configuration of Cell_3 is switched to the uplink and downlink sub-frame configuration 2 because its downlink services increase and its downlink services is greater than the downlink services of Cell_2, while Cell_1 still adopts the uplink and downlink sub-frame configuration 0.

Figure 4:
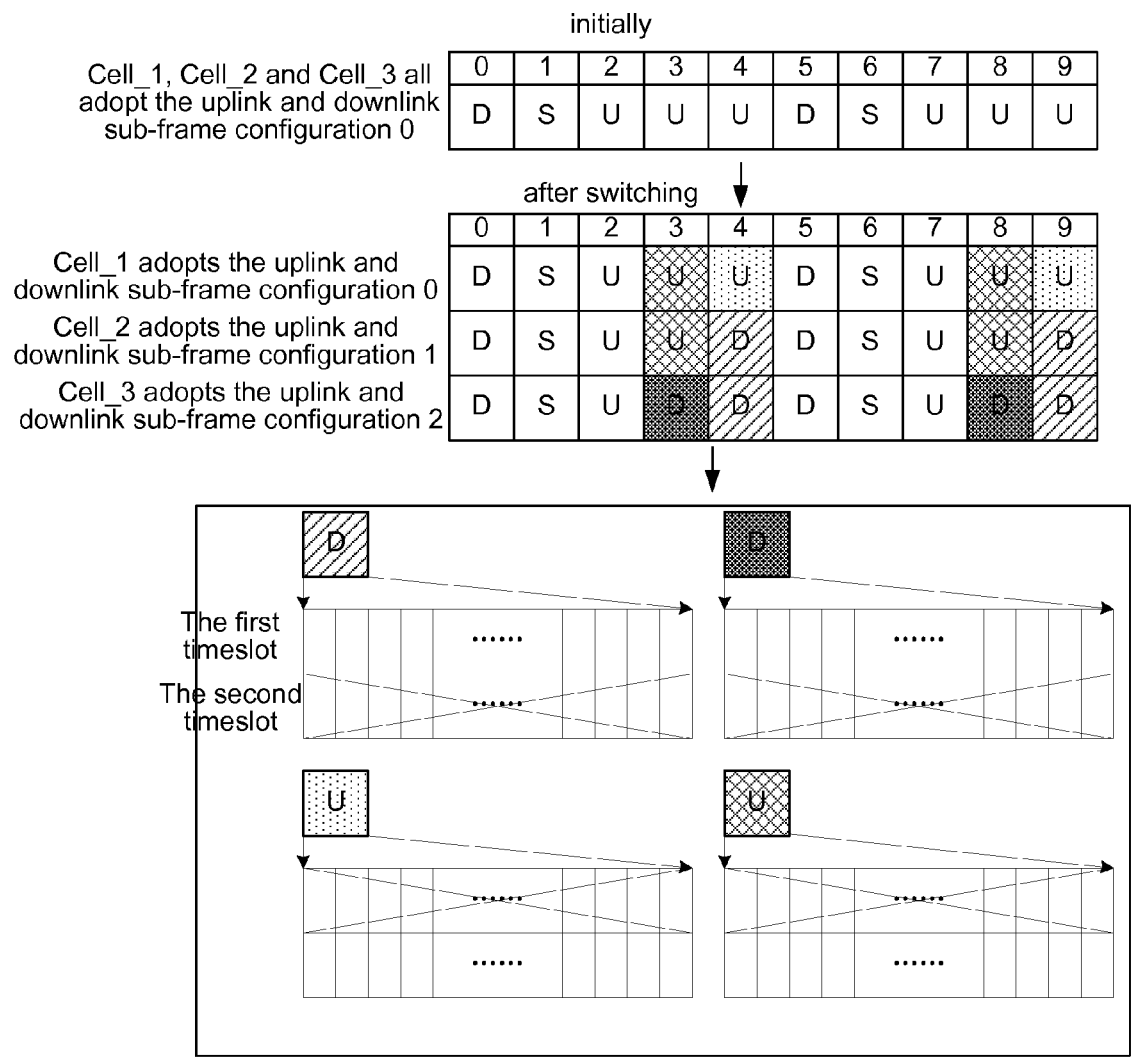
FIG. 4 shows an implementation diagram of a dynamic sub-frame configuration method in the TDD system according to embodiment 1 of the disclosure.

In this embodiment, according to Table 1, after switching, as shown in FIG. 4, 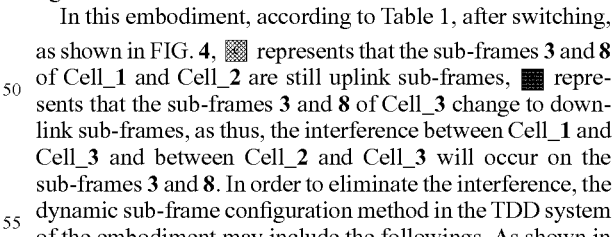 represents that the sub-frames 3 and 8 of Cell_1 and Cell_2 are still uplink sub-frames, 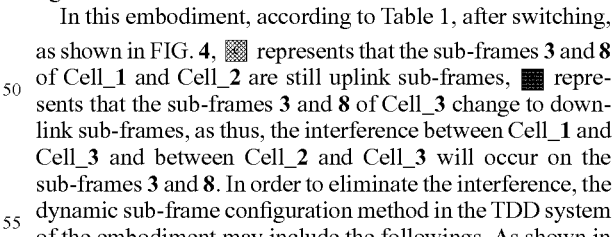 represents that the sub-frames 3 and 8 of Cell_3 change to downlink sub-frames, as thus, the interference between Cell_1 and Cell_3 and between Cell_2 and Cell_3 will occur on the sub-frames 3 and 8. In order to eliminate the interference, the dynamic sub-frame configuration method in the TDD system of the embodiment may include the followings. As shown in FIG. 4, 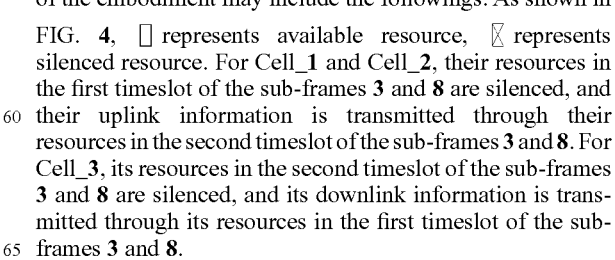 represents available resource, 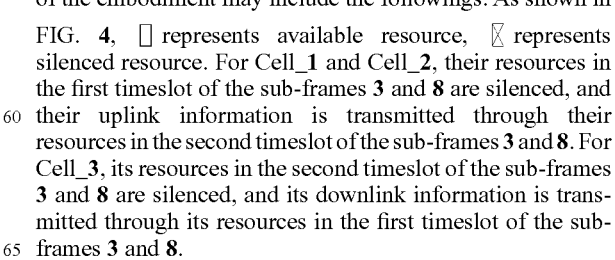 represents silenced resource. For Cell_1 and Cell_2, their resources in the first timeslot of the sub-frames 3 and 8 are silenced, and their uplink information is transmitted through their resources in the second timeslot of the sub-frames 3 and 8. For Cell_3, its resources in the second timeslot of the sub-frames 3 and 8 are silenced, and its downlink information is transmitted through its resources in the first timeslot of the sub-frames 3 and 8.

In practical application, when Cell_1 and Cell_2 need to transmit uplink information on the sub-frames 3 and 8, the uplink information is transmitted only through the available resource ☐ that ▦ in FIG. 4 corresponds to, namely the uplink information is transmitted in the second timeslot of the sub-frames 3 and 8. When Cell_3 needs to transmit downlink information on the sub-frames 3 and 8, the downlink information is transmitted only through the available resource ☐ that ▰ in FIG. 4 corresponds to, namely the downlink information is transmitted in the first timeslot of the sub-frames 3 and 8.

The uplink codirectional interference that may exist between Cell_1 and Cell_2 in the second timeslot may be eliminated by using an uplink Inter-Cell Interference Coordination (ICIC) mechanism.

In addition, according to Table 1, after switching, as shown in FIG. 4, ▨ represents that the sub-frames 4 and 9 of Cell_1 are still uplink sub-frames, ▨ represents that both the sub-frames 4 and 9 of Cell_2 and Cell_3 change to downlink sub-frames, as thus, the interference between Cell_1 and Cell_2 and between Cell_1 and Cell_3 will occur on the sub-frames 4 and 9. In order to eliminate the interference, the dynamic sub-frame configuration method in the TDD system of the embodiment may further include the followings. For Cell_1, its resources in the first timeslot of the sub-frames 4 and 9 are silenced, and its uplink information is transmitted through its resources in the second timeslot of the sub-frames 4 and 9. For Cell_2 and Cell_3, their resources in the second timeslot of the sub-frames 4 and 9 are silenced, and their downlink information is transmitted through their resources in the first timeslot of the sub-frames 4 and 9.

In practical application, when Cell_1 needs to transmit uplink information on the sub-frames 4 and 9, the uplink information is transmitted only through the available resource ☐ that ▨ in FIG. 4 corresponds to, namely the uplink information is transmitted in the second timeslot of the sub-frames 4 and 9. When Cell_2 and Cell_3 needs to transmit downlink information on the sub-frames 4 and 9, the downlink information is transmitted only through the available resource ☐ that ▨ in FIG. 4 corresponds to, namely the downlink information is transmitted in the first timeslot of the sub-frames 4 and 9.

The downlink codirectional interference that may exist between Cell_2 and Cell_3 in the first timeslot may be eliminated by using a downlink ICIC mechanism.

Embodiment 2

In this embodiment, Cell_1, Cell_2 and Cell_3 in the TDD system all adopt the uplink and downlink sub-frame configuration 2 in Table 1 initially; after that, the uplink and downlink sub-frame configuration of Cell_2 is switched to the uplink and downlink sub-frame configuration 1 in Table 1 because the uplink services of Cell_2 increase, the uplink and downlink sub-frame configuration of Cell_3 is switched to the uplink and downlink sub-frame configuration 0 in Table 1 because the uplink services of Cell_3 increases much more than the uplink services of Cell_2, and Cell_1 still adopts the uplink and downlink sub-frame configuration 2.

Figure 5:
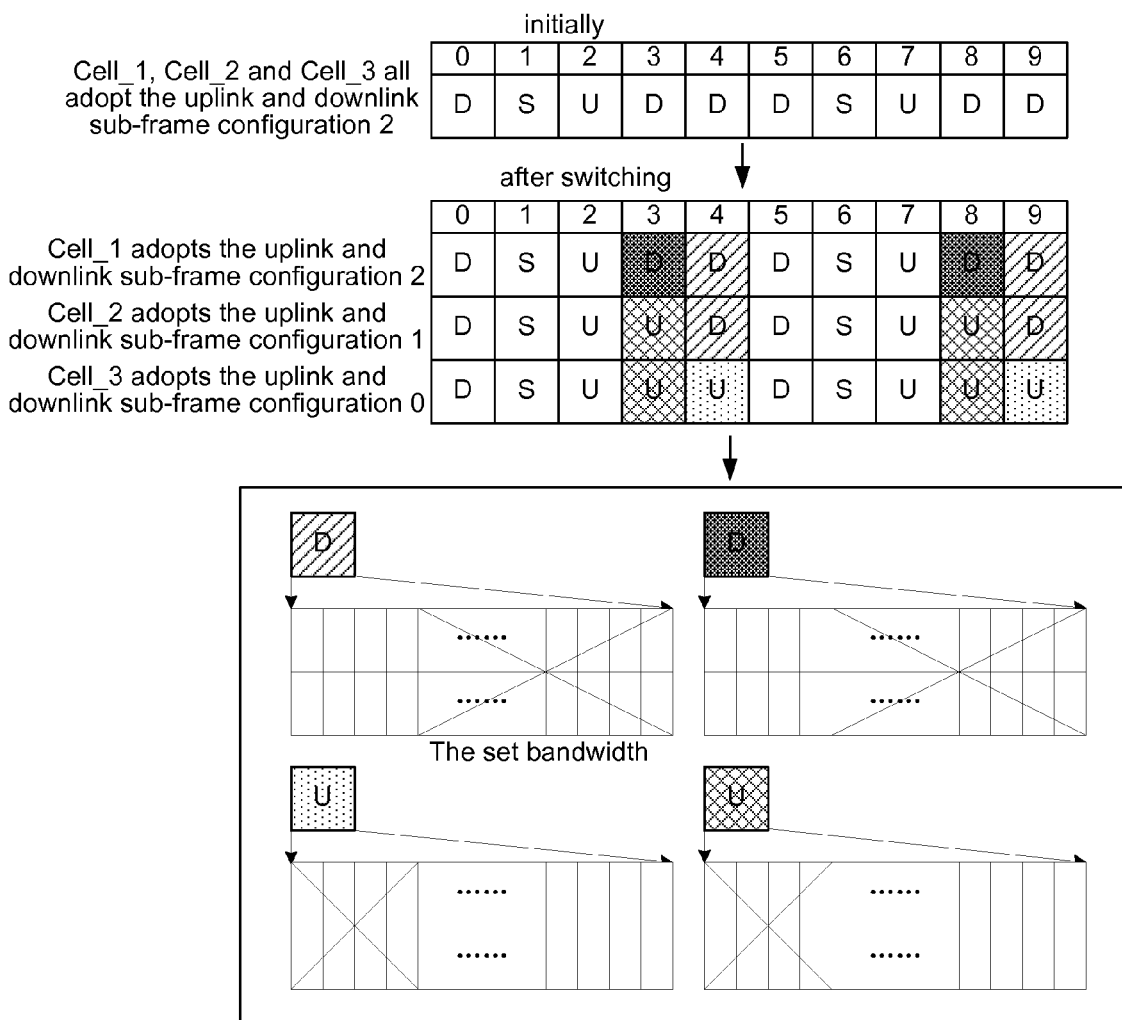
FIG. 5 shows an implementation diagram of a dynamic sub-frame configuration method in the TDD system according to embodiment 2 of the disclosure.

After switching, as shown in FIG. 5, ▰ represents that the sub-frames 3 and 8 of Cell_1 are still downlink sub-frames, ▨ represents that the sub-frames 3 and 8 of Cell_2 and Cell-3 switch to uplink sub-frames, as thus, the interference between Cell_1 and Cell_2 and between Cell_1 and Cell_3 will occur on the sub-frames 3 and 8. In order to eliminate the interference, the dynamic sub-frame configuration method in the TDD system of the embodiment may include the followings. As shown in FIG. 5, ☐ represents available resource, ⊠ represents silenced resource. For Cell_1, the resources in the set bandwidth are silenced on sub-frames 3 and 8, as the resources ⊠ that ▰ in FIG. 5 corresponds to, and the downlink information is transmitted through the frequency resources not silenced on its sub-frames 3 and 8. For Cell_2 and Cell_3, the resources, corresponding to the frequency resources not silenced of Cell_1, on sub-frames 3 and 8 are silenced, as the resources ⊠ that ▨ in FIG. 5 corresponds to, and the downlink information is transmitted through the frequency resources not silenced on the sub-frames of Cell_2 and Cell_3; wherein the uplink codirectional interference that may exist between Cell_2 and Cell_3 on the sub-frames 3 and 8 may be eliminated by using the uplink ICIC mechanism.

In practical application, when Cell_1 needs to transmit downlink information on the sub-frames 3 and 8, the downlink information is transmitted only through the resource ☐ that ▰ corresponds to. When Cell_2 and Cell_3 need to transmit uplink information on the sub-frames 3 and 8, the uplink information is transmitted only through the resource ☐ that ▨ corresponds to.

In addition, after switching, as shown in FIG. 5, ▨ represents that the sub-frames 4 and 9 of Cell_1 and Cell_2 are uplink sub-frames, ▨ represents that the sub-frames 4 and 9 of Cell_1 are downlink sub-frames, as thus, interference between Cell_1 and Cell_3 and between Cell_2 and Cell_3 will occur on the sub-frames 4 and 9. In order to eliminate the interference, the dynamic sub-frame configuration method in the TDD system of the embodiment may further include the followings. For Cell_1 and Cell_2, the resources in the set bandwidth on sub-frames 4 and 9 are silenced, as the resources ⊠ that ▨ in FIG. 5 corresponds to, and the downlink information is transmitted though the frequency resources not silenced on the sub-frames 4 and 9. For Cell_3, the resources, corresponding to the frequency resources not silenced on the sub-frames 4 and 9 of Cell_1 and Cell_2, on sub-frames 4 and 9 are silenced, as the resources ⊠ that ▨ in FIG. 5 corresponds to, and the uplink information of Cell_3 is transmitted through the frequency resources not silenced on its sub-frames 4 and 9. The downlink codirectional interference that may exist between Cell_1 and Cell_2 may be eliminated by using the downlink ICIC mechanism.

In practical application, as shown in FIG. 5, when Cell_1 and Cell_2 need to transmit downlink information on the sub-frames 4 and 9, the downlink information is transmitted only through the resource ☐ that ▨ corresponds to. When Cell_3 needs to transmit uplink information on the sub-frames 4 and 9, the uplink information is transmitted only through the resource ☐ that ▨ corresponds to.

Embodiment 3

In the scenario of the embodiment 2, the method of this embodiment 3 may also be adopted to reduce the interference among Cell_1, Cell_2 and Cell_3 which is caused by different uplink and downlink sub-frame configurations.

Figure 6:
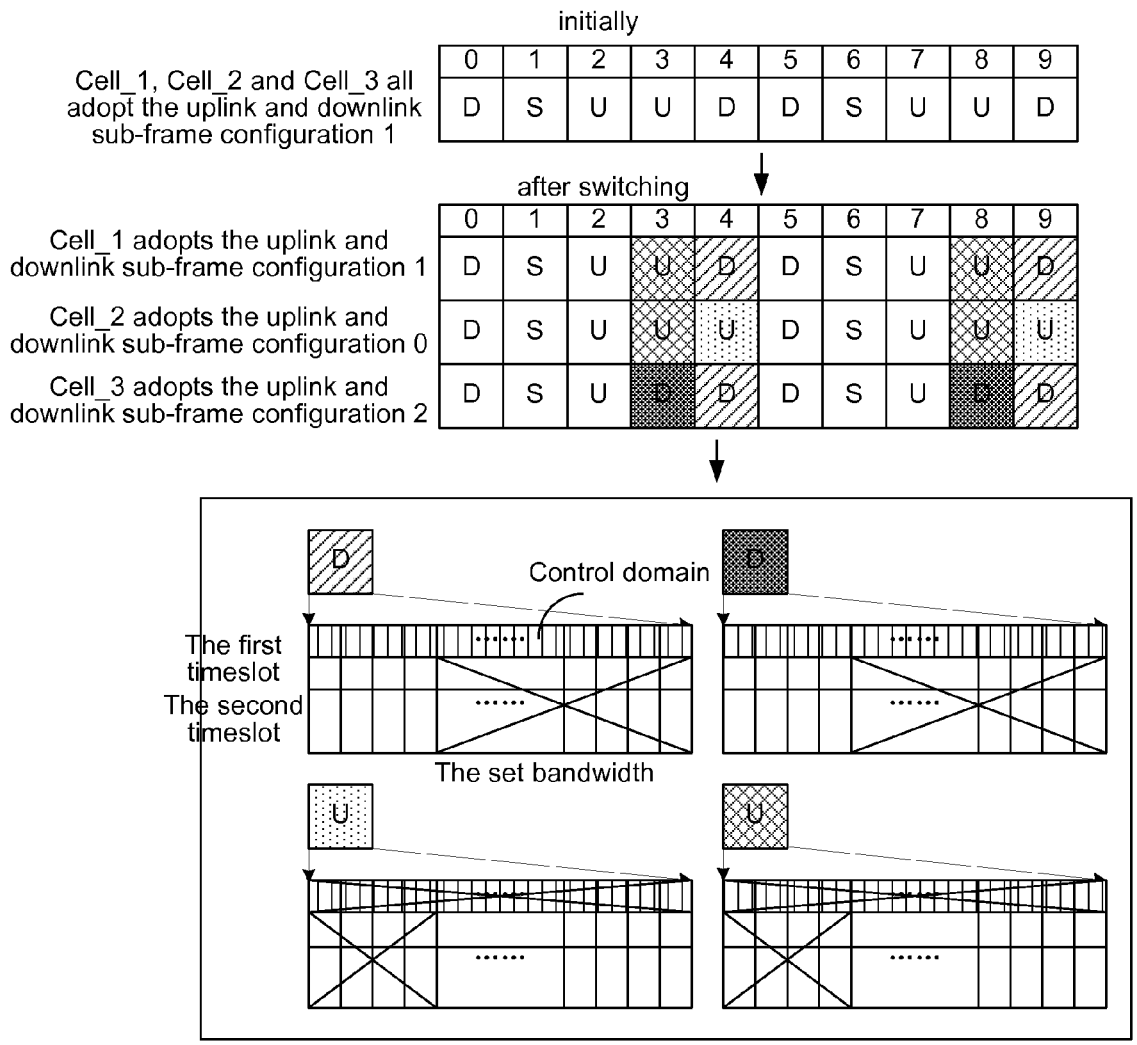
FIG. 6 shows an implementation diagram of a dynamic sub-frame configuration method in the TDD system according to embodiment 3 of the disclosure.
Figure 7:
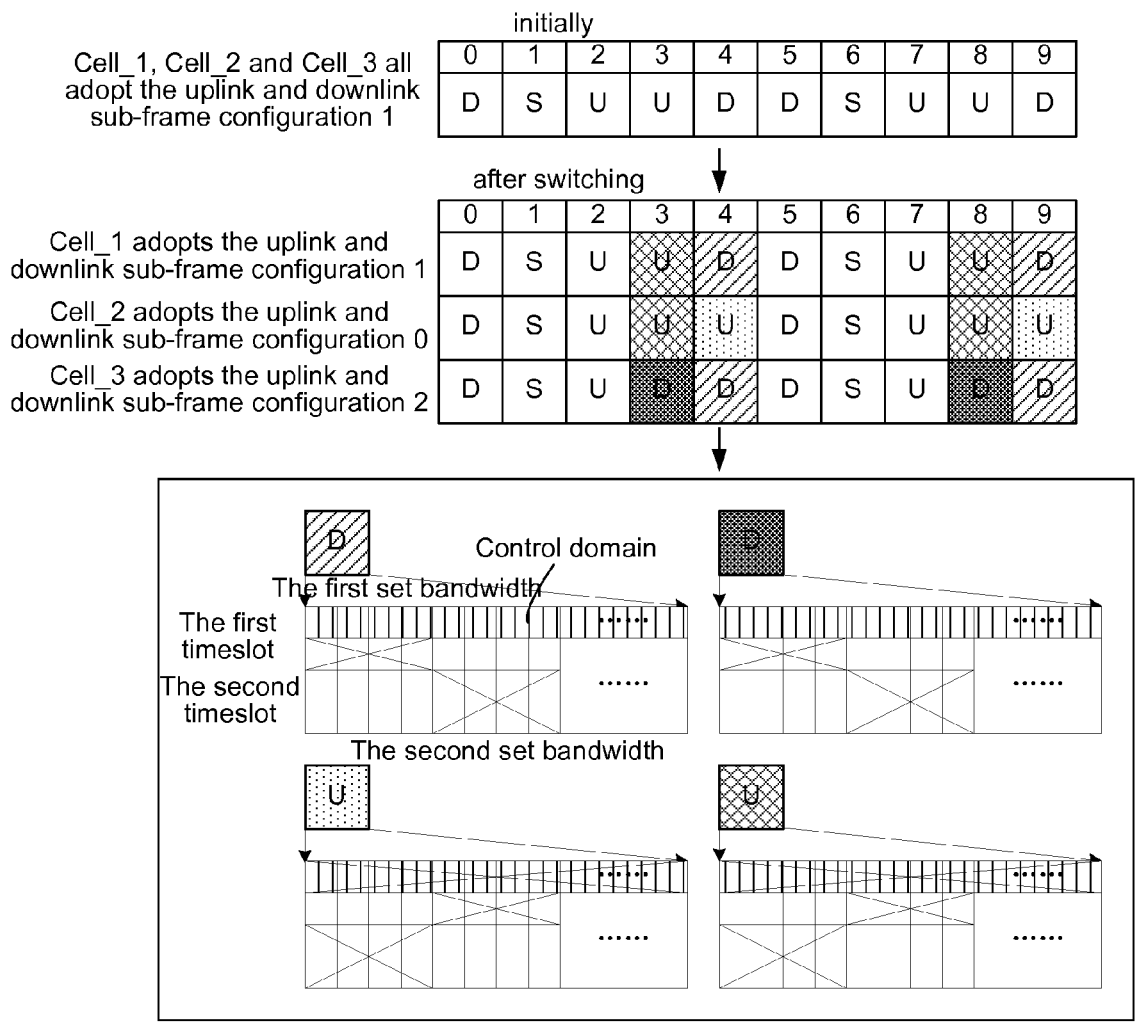
FIG. 7 shows an implementation diagram of another dynamic sub-frame configuration method in the TDD system according to embodiment 3 of the disclosure.
Figure 8:
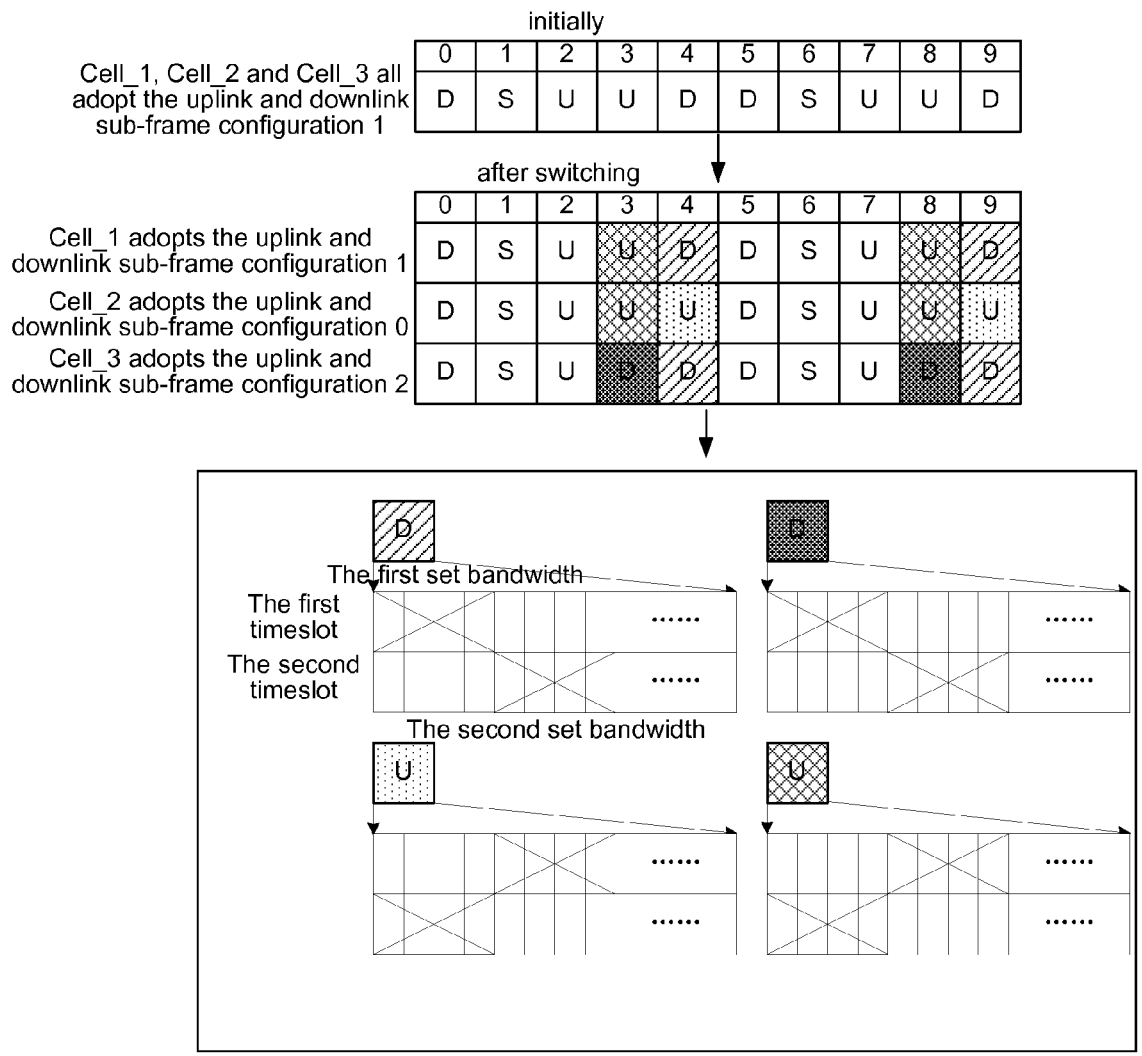
FIG. 8 shows an implementation diagram of another dynamic sub-frame configuration method in the TDD system according to embodiment 3 of the disclosure.

The interference on the sub-frames 3 and 8 may be eliminated by three methods shown in FIG. 6, FIG. 7 and FIG. 8.

As shown in FIG. 6, the resources except the control domain in the first timeslot within the set bandwidth and the resources in the second timeslot within the set bandwidth on the sub-frames 3 and 8 of Cell_3 are silenced, as the resources  that  in FIG. 6 corresponds to; and the resources, corresponding to the resources not silenced on the sub-frames 3 and 8 of Cell_3, on the sub-frames 3 and 8 of Cell_1 and Cell_2 are silenced, as the resources  and resources  that  in FIG. 6 corresponds to, wherein  represents the silenced resources of Cell₁ and Cell_2 on the sub-frames 3 and 8, which correspond to the control domain resources not silenced in the first timeslot of the sub-frames 3 and 8 within the set bandwidth of Cell_3, and  represents the silenced resources of Cell_1 and Cell_2 on the sub-frames 3 and 8, which corresponds to the non-silent resources except the non-silent control domain resources on the sub-frames 3 and 8 of Cell_3. When Cell_1 and Cell_2 need to transmit uplink information on the sub-frames 3 and 8, the uplink information is transmitted only through their non-silent resources, as the resources  that  in FIG. 6 corresponds to. When Cell_3 needs to transmit downlink information on the sub-frames 3 and 8, the downlink information is transmitted only through its non-silent resources, as the resources  that  in FIG. 6 corresponds to.

Alternatively, as shown in FIG. 7, the resources except the control domain in the first timeslot within the first set bandwidth and the resources in the second timeslot within the second set bandwidth on the sub-frames 3 and 8 of Cell_3 are silenced, as the resources  that  in FIG. 7 corresponds to; and the resources, corresponding to the resources not silenced on the sub-frames 3 and 8 of Cell_3, on the sub-frames 3 and 8 of Cell_1 and Cell_2 are silenced, as the resources  and resources  that  in FIG. 7 corresponds to. When Cell_1 and Cell_2 need to transmit uplink information on the sub-frames 3 and 8, the uplink information is transmitted only through their non-silent resources, as the resources  that  in FIG. 7 corresponds to. When Cell_3 needs to transmit downlink information on the sub-frames 3 and 8, the downlink information is transmitted only through its non-silent resources, as the resources  that  in FIG. 7 corresponds to.

Alternatively, as shown in FIG. 8, the resources in the first timeslot within the first set bandwidth and the resources in the second timeslot within the second set bandwidth on the sub-frames 3 and 8 of Cell_3 are silenced, as the resources  that  in FIG. 8 corresponds to; and the resources, corresponding to the resources not silenced on the sub-frames 3 and 8 of Cell_3, on the sub-frames 3 and 8 of Cell_1 and Cell_2 are silenced, as the resources  that  in FIG. 8 corresponds to. When Cell_1 and Cell_2 need to transmit uplink information on the sub-frames 3 and 8, the uplink information is transmitted only through their non-silent resources, as the resources  that  in FIG. 8 corresponds to. When Cell_3 needs to transmit downlink information on the sub-frames 3 and 8, the downlink information is transmitted only through its non-silent resources, as the resources  that  in FIG. 8 corresponds to.

The uplink codirectional interference that may exist between Cell_1 and Cell_2 may be eliminated by using the uplink ICIC mechanism.

In this embodiment, the interference on the sub-frames 4 and 9 may be eliminated by the methods shown in FIG. 6, FIG. 7 and FIG. 8. Similarly, the resources  that  corresponds to on the sub-frames 4 and 9 of Cell_1 and Cell_3 are silenced, and the resources  and resources  that  corresponds to on the sub-frames 4 and 9 of Cell_2 are silenced. When Cell_1 and Cell_3 need to transmit downlink information on the sub-frames 4 and 9, the downlink information is transmitted only through their non-silent resources, namely through the resources  that  corresponds to. When Cell_2 needs to transmit uplink information on the sub-frames 4 and 9, the uplink information is transmitted only through its non-silent resources, namely through the resources  that  corresponds to.

The downlink codirectional interference that may exist between Cell_1 and Cell_3 may be eliminated by using the downlink ICIC mechanism.

It should be noted that, the downlink information mentioned in above embodiments may include one or more of the followings: PDCCH, PHICH, PDSCH, CRS, UE-specific Reference Signals (UE-RS), Demodulation Reference Signal (DMRS) and Channel State Information Reference Signal (CSI-RS).

The PDCCH bears downlink control information corresponding to the UE. The PHICH bears ACK/NACK information corresponding to the uplink service. The PDSCH bears downlink service information corresponding to the UE. The CRS bears the public reference signal of cells. The UE-RS bears the UE-specific downlink reference signal. The DMRS bears the downlink demodulation reference signal of the UE. The CSI-RS bears the downlink channel state information reference signal of the cell.

The uplink information mentioned in above embodiments may include one or more of the followings: PUCCH, PUSCH, DMRS and SRS. Both the PUCCH and PUSCH may bear the Channel Quality Indicator (CQI), the Precoding Matrix Indicator (PMI), the Rank Indication (RI) and the Scheduling Request (SR). The DMRS bears the uplink demodulation reference signal of the UE. The SRS bears the uplink channel measurement reference signal of the UE.

The above is only the preferred embodiments of the disclosure and not intended to limit the scope of the disclosure; any modifications, equivalent replacements, improvements and the like within the principle of the disclosure shall fall within the scope of the disclosure.

The invention claimed is:

1. A dynamic sub-frame configuration method in a Time Division Duplex (TDD) method, comprising:
   in the case that the uplink and downlink sub-frame configuration of a cell and the uplink and downlink sub-frame configuration of its neighboring cell are different in the configuration of a sub-frame,
   silencing resources in a set timeslot and/or a set bandwidth on the sub-frame for the cell, and silencing resources on the sub-frame for the neighboring cell corresponding to the resources not silenced on the sub-frame for the cell; alternatively, silencing the resources in the set timeslot and/or the set bandwidth on the sub-frame for the neighboring cell, and silencing the resources on the sub-frame for the cell corresponding to the resources not silenced on the sub-frame for the neighboring cell.

2. The method according to claim 1, further comprising: when the cell and/or the neighboring cell need/needs to transmit information on the sub-frame, transmitting the information only through their respective resources not silenced on the sub-frame.

3. The method according to claim 2, wherein silencing the resources in the set timeslot comprises:
silencing the resources in a first timeslot of the sub-frame for the cell, and silencing the resources in a second timeslot of the sub-frame for the neighboring cell; or
silencing the resources in the second timeslot of the sub-frame for the cell, and silencing the resources in the first timeslot of the sub-frame for the neighboring cell.

4. The method according to claim 2, wherein silencing the resources in the set timeslot and the set bandwidth comprises:
silencing the resources in a first or a second timeslot of the sub-frame within the set bandwidth for the cell, and silencing the resources on the sub-frame for the neighboring cell corresponding to the resources not silenced on the sub-frame for the cell; or
silencing the resources in the first or the second timeslot of the sub-frame within the set bandwidth for the neighboring cell, and silencing the resources on the sub-frame for the cell corresponding to the resources not silenced on the sub-frame for the neighboring cell.

5. The method according to claim 2, wherein silencing the resources in the set timeslot and the set bandwidth comprises:
silencing the resources except control domain in a first timeslot of the sub-frame within the set bandwidth and the resources in a second timeslot of the sub-frame within the set bandwidth for the cell, and silencing the resources on the sub-frame for the neighboring cell corresponding to the resources not silenced on the sub-frame for the cell; or
silencing the resources except the control domain in the first timeslot of the sub-frame within the set bandwidth and the resources in the second timeslot of the sub-frame within the set bandwidth for the neighboring cell, and silencing the resources on the sub-frame for the cell corresponding to the resources not silenced on the sub-frame for the neighboring cell.

6. The method according to claim 2, wherein silencing the resources in the set timeslot and the set bandwidth comprises:
presetting a first set bandwidth and a second set bandwidth;
silencing the resources except control domain in a first timeslot of the sub-frame within the first set bandwidth and the resources in a second timeslot of the sub-frame within the second set bandwidth for the cell, and silencing the resources on the sub-frame for the neighboring cell corresponding to the resources not silenced on the sub-frame for the cell; or
silencing the resources except the control domain in the first timeslot of the sub-frame within the first set bandwidth and the resources in the second timeslot of the sub-frame within the second set bandwidth for the neighboring cell, and silencing the resources on the sub-frame for the cell corresponding to the resources not silenced on the sub-frame for the neighboring cell.

7. The method according to claim 1, wherein the quantity of the set bandwidth is one or more.

8. The method according to claim 1, wherein silencing the resources in the set timeslot comprises:
silencing the resources in a first timeslot of the sub-frame for the cell, and silencing the resources in a second timeslot of the sub-frame for the neighboring cell; or
silencing the resources in the second timeslot of the sub-frame for the cell, and silencing the resources in the first timeslot of the sub-frame for the neighboring cell.

9. The method according to claim 1, wherein silencing the resources in the set timeslot and the set bandwidth comprises:
silencing the resources in a first or a second timeslot of the sub-frame within the set bandwidth for the cell, and silencing the resources on the sub-frame for the neighboring cell corresponding to the resources not silenced on the sub-frame for the cell; or
silencing the resources in the first or the second timeslot of the sub-frame within the set bandwidth for the neighboring cell, and silencing the resources on the sub-frame for the cell corresponding to the resources not silenced on the sub-frame for the neighboring cell.

10. The method according to claim 1, wherein silencing the resources in the set timeslot and the set bandwidth comprises:
silencing the resources except control domain in a first timeslot of the sub-frame within the set bandwidth and the resources in a second timeslot of the sub-frame within the set bandwidth for the cell, and silencing the resources on the sub-frame for the neighboring cell corresponding to the resources not silenced on the sub-frame for the cell; or
silencing the resources except the control domain in the first timeslot of the sub-frame within the set bandwidth and the resources in the second timeslot of the sub-frame within the set bandwidth for the neighboring cell, and silencing the resources on the sub-frame for the cell corresponding to the resources not silenced on the sub-frame for the neighboring cell.

11. The method according to claim 1, wherein silencing the resources in the set timeslot and the set bandwidth comprises:
presetting a first set bandwidth and a second set bandwidth;
silencing the resources except control domain in a first timeslot of the sub-frame within the first set bandwidth and the resources in a second timeslot of the sub-frame within the second set bandwidth for the cell, and silencing the resources on the sub-frame for the neighboring cell corresponding to the resources not silenced on the sub-frame for the cell; or
silencing the resources except the control domain in the first timeslot of the sub-frame within the first set bandwidth and the resources in the second timeslot of the sub-frame within the second set bandwidth for the neighboring cell, and silencing the resources on the sub-frame for the cell corresponding to the resources not silenced on the sub-frame for the neighboring cell.

12. A dynamic sub-frame configuration apparatus in a Time Division Duplex (TDD) apparatus, comprising: a first silencing unit and a second silencing unit, wherein in the case that the uplink and downlink sub-frame configuration of a cell and the uplink and downlink sub-frame configuration of its neighboring cell are different in the configuration of a sub-frame,
the first silencing unit is configured to silence resources in a set timeslot and/or a set bandwidth on the sub-frame for the cell, and the second silencing unit is configured to silence resources on the sub-frame for the neighboring cell corresponding to the resources on the sub-frame not silenced by the first silencing unit for the cell; or
the first silencing unit is configured to silence the resources in the set timeslot and/or the set bandwidth on the sub-frame for the neighboring cell, and the second silencing unit is configured to silence the resources on the sub-frame for the cell corresponding to the resources on the sub-frame not silenced by the first silencing unit for the neighboring cell.

13. The apparatus according to claim 12, further comprising: a transmitting unit, wherein
the transmitting unit is configured to, when the cell and/or the neighboring cell need/needs to transmit information on the sub-frame, transmit the information only through their respective resources not silenced on the sub-frame.

14. The apparatus according to claim 12, wherein the first silencing unit is configured to silence the resources in a first timeslot of the sub-frame for the cell, and the second silencing unit is configured to silence the resources in a second timeslot of the sub-frame for the neighboring cell; or
the first silencing unit is configured to silence the resources in the second timeslot of the sub-frame for the cell, and the second silencing unit is configured to silence the resources in the first timeslot of the sub-frame for the neighboring cell.

15. The apparatus according to claim 12, wherein the first silencing unit is configured to silence the resources in a first or a second timeslot of the sub-frame within the set bandwidth for the cell, and the second silencing unit is configured to silence the resources on the sub-frame for the neighboring cell corresponding to the resources not silenced on the sub-frame for the cell; or
the first silencing unit is configured to silence the resources in the first or the second timeslot of the sub-frame within the set bandwidth for the neighboring cell, and the second silencing unit is configured to silence the resources on the sub-frame for the cell corresponding to the resources not silenced on the sub-frame for the neighboring cell.

16. The apparatus according to claim 12, wherein the first silencing unit is configured to silence the resources except control domain in a first timeslot of the sub-frame within the set bandwidth and the resources in a second timeslot of the sub-frame within the set bandwidth for the cell, and the second silencing unit is configured to silence the resources on the sub-frame for the neighboring cell corresponding to the resources not silenced on the sub-frame for the cell; or
the first silencing unit is configured to silence the resources except the control domain in the first timeslot of the sub-frame within the set bandwidth and the resources in the second timeslot of the sub-frame within the set bandwidth for the neighboring cell, and the second silencing unit is configured to silence the resources on the sub-frame for the cell corresponding to the resources not silenced on the sub-frame for the neighboring cell.

17. The apparatus according to claim 12, wherein a first set bandwidth and a second set bandwidth are preset,
wherein the first silencing unit is configured to silence the resources except control domain in a first timeslot of the sub-frame within the first set bandwidth and the resources in a second timeslot of the sub-frame within the second set bandwidth for the cell, and the second silencing unit is configured to silence the resources on the sub-frame for the neighboring cell corresponding to the resources not silenced on the sub-frame for the cell; or
the first silencing unit is configured to silence the resources except the control domain in the first timeslot of the sub-frame within the first set bandwidth and the resources in the second timeslot of the sub-frame within the second set bandwidth for the neighboring cell, and the second silencing unit is configured to silence the resources on the sub-frame for the cell corresponding to the resources not silenced on the sub-frame for the neighboring cell.

* * * * *